June 29, 1937.   E. H. SCHNUELLE   2,085,340
RELEASABLE HITCH
Filed Oct. 16, 1936   2 Sheets-Sheet 1

INVENTOR
ELDRED H. SCHNUELLE
BY
ATTORNEYS

June 29, 1937. E. H. SCHNUELLE 2,085,340
RELEASABLE HITCH
Filed Oct. 16, 1936 2 Sheets-Sheet 2
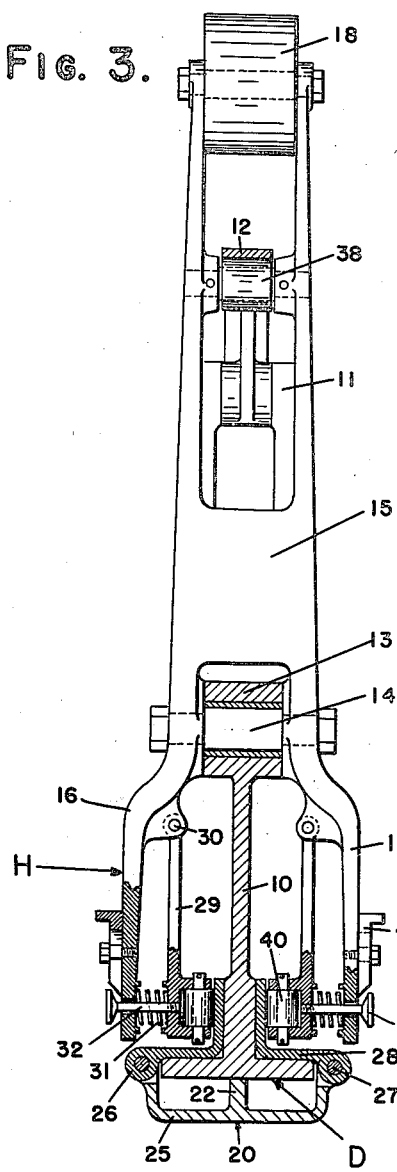
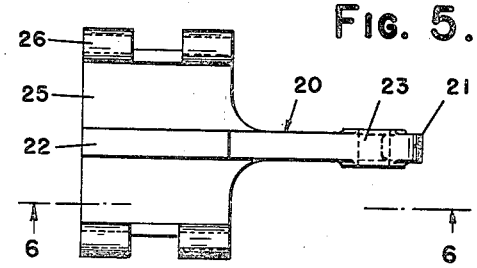
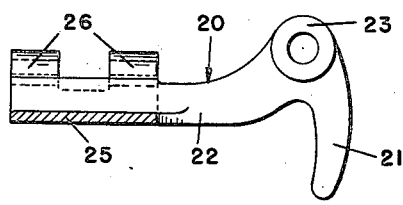
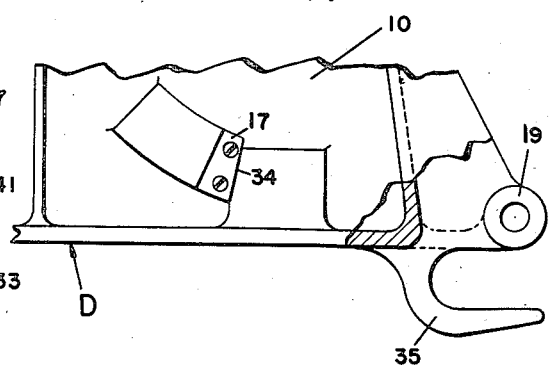
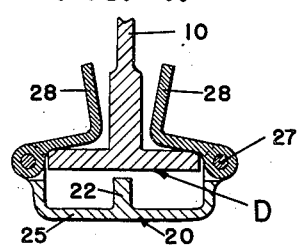
INVENTOR
ELDRED H. SCHNUELLE
BY
ATTORNEYS Patented June 29, 1937

2,085,340

UNITED STATES PATENT OFFICE 2,085,340

RELEASABLE HITCH

Eldred H. Schnuelle, Manitowoc, Wis.

Application October 16, 1936, Serial No. 105,962

6 Claims. (Cl. 280—33.16)

This invention appertains to hitches, and more particularly to novel means for connecting a trailing vehicle or implement to a drawing vehicle.

In the use of farm implements with tractors considerable damage results when the implement strikes a solid construction, such as a rock or the root or stump of a tree. In some instances the operator is even injured due to the rearing back of the tractor.

Therefore, one of the primary objects of my present invention is to provide novel means for permitting the automatic release of a farm implement from a tractor when the implement strikes a solid object, so that injury to the implement, tractor, and operator will be prevented.

It has been proposed to provide a hitch which will release at a predetermined load. These hitches are impractical, in view of the fact that load conditions vary to a large degree and depend upon soil conditions and certain other factors. Thus, these hitches often release when they are not expected to or desired to do so.

Another salient object of my invention is to provide a hitch having a swinging coupler head for detachably engaging an implement clevice, and a rock lever normally holding the coupler head against movement, with releasable catches associated with the lever and operated by the coupler head when the implement strikes a solid object, so as to permit movement of the lever to release the swinging coupler head from the clevice.

A further important object of my invention is the provision of novel means for mounting the coupler head on the drawbar of the tractor, whereby the same will normally tend to move to a released position, with a weighted lever normally held against movement by releasable catches for holding the coupler head in its operative coupled position.

A still further object of my invention is to provide an implement hitch releasable when the implement strikes a solid object, which is of a strong and rugged nature, and which can be manufactured and incorporated with a tractor at a comparatively small cost.

With these and other objects in view, the invention consists in the novel construction, arrangement, and formation of parts, as will be hereinafter more specifically described, claimed, and illustrated in the accompanying drawings, in which drawings:

Figure 3 is a vertical section through the hitch, taken substantially on the line 3—3 of Figure 2, looking in the direction of the arrows.

Figure 4 is a detail fragmentary section through the lower end of the hitch, showing the initial position of the hinge leaves when an implement strikes a solid object.

Figure 5 is a top plan view of the coupler.

Figure 6 is a section through the coupler, taken on the line 6—6 of Figure 5, looking in the direction of the arrows.

Figure 7 is a fragmentary side elevation of the body portion of the hitch, with the coupler removed therefrom, parts of the view being shown broken away and in section.

Figure 1:
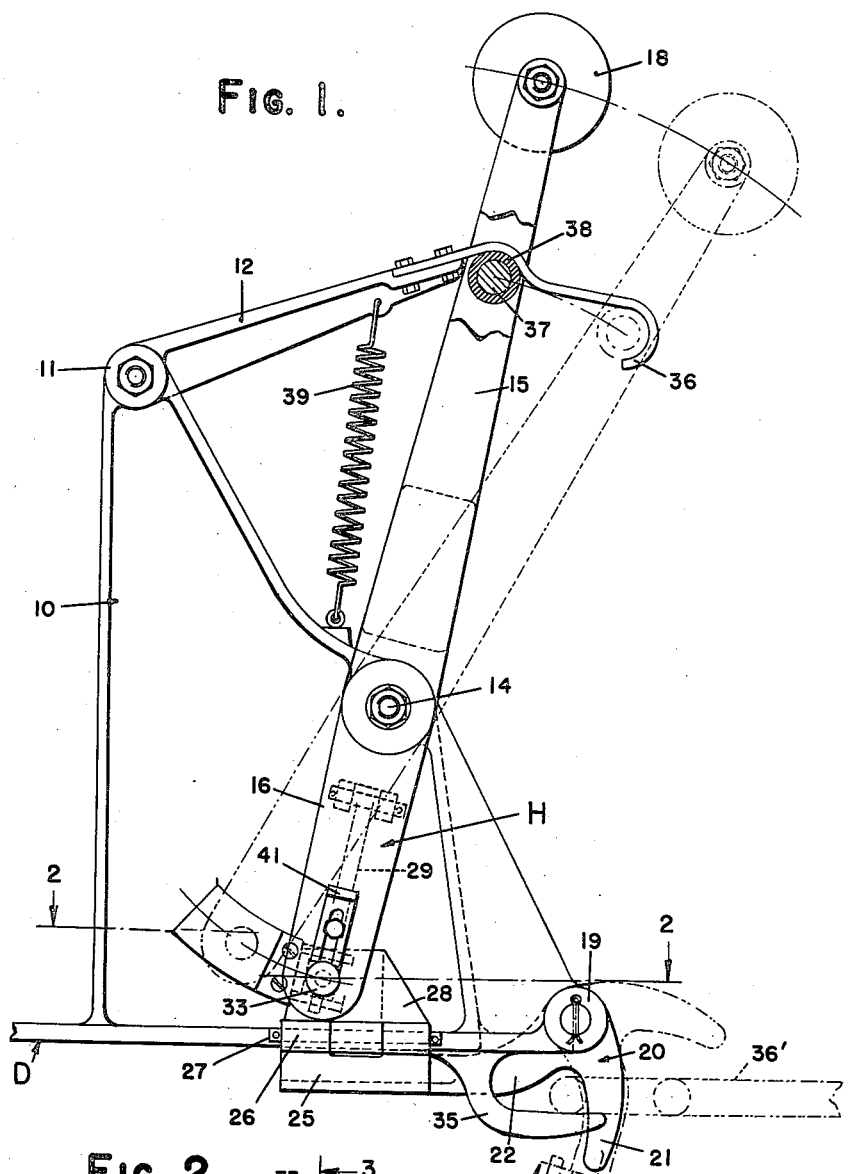
Figure 1 is a side elevation of my improved releasable hitch, showing the coupler head in its operative position, parts of the figure being shown broken away and in section.

Referring to the drawings in detail, wherein similar reference characters designate corresponding parts throughout the several views, the letter D indicates a drawbar which can be connected to a tractor in any desired manner. This drawbar D carries my novel hitch generally indicated by the reference character H.

In accordance with my invention, I form on the drawbar an upstanding rugged bracket 10. This bracket, at its extreme upper rear end, has formed thereon bearing bosses 11 for a swinging latch lever 12, the purpose of which will be later set forth. At a point below the bearing bosses 11, the bracket 10 has formed thereon a similar bearing boss 13 for a pivot bolt or shaft 14 on which is rockably mounted the hitch rocking lever 15. The lever, at its lower end, is bifurcated to provide arms 16 and 17, which straddle the bracket 10 below the pivot pin or shaft 14. The extreme upper end of the lever carries a weight 18, which, as shown, is in the nature of a roller.

Below the bearing boss 13, the bracket 10 has formed thereon at its extreme outer end, spaced bearing bosses 19, which receive therebetween the coupler 20. The coupler 20 includes a depending coupler head or nose 21 and the inwardly extending tailpiece 22. The tailpiece 22 is arranged substantially at right angles to the coupler head or nose, and the coupler has formed thereon, at the juncture of the head and tail, a bearing 23. A suitable pivot pin 24 extends through the bearing boss 19 and the bearing 23, for rockably holding the coupler head in position. Due to the weight of the tail 22, the coupler head or nose 21 will be normally held in a raised released position, as shown in dotted lines in Figure 1 of the drawings.

Figure 2:
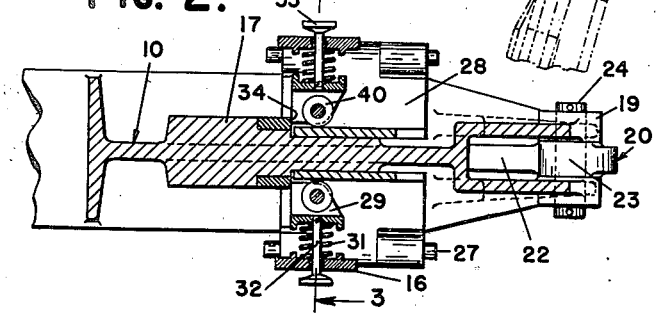
Figure 2 is a horizontal section through the hitch, taken on the line 2—2 of Figure 1, looking in the direction of the arrows.

The tail 22, on opposite sides thereof, has formed thereon laterally extending webs 25, which carry hinge barrels 26. These hinge barrels 26 project beyond the body portion of the hitch or drawbar when the tail is in its raised position, as shown in Figures 1 to 3 inclusive. The hinge barrels 26 have pivotally connected thereto by means of hinge pins 27 hinge leaves 28, which are of an angle-shape in cross-section. The hinge leaves 28 normally rest on top of the drawbar, with their vertical portions against the opposite sides of the bracket.

These hinge leaves are normally held against the opposite sides of the bracket by arms 29, which are pivotally connected, as at 30, to the inner faces of the legs 16 and 17 of the hitch lock lever 15. The arms 29 are normally held toward the vertical portion of the leaves 28 by expansion coil springs 31. The springs 31 are confined between the legs 16 and 17 and the arms 29, and are preferably placed around slide rods 32, which are rigidly connected to the arms 29. These slide rods 32 extend loosely through the lower ends of the legs 16 and 17 and terminate in cone-shaped heads 33. The bracket 10 carries directly in rear of the hinge leaves, keeper stop shoulders 34, and these shoulders are arranged in the path of the arms 29 to prevent the normal swinging movement of the hitch lock lever under influence of its weight 18.

The outer end of the drawbar has formed on its lower surface the outwardly extending bifurcated tongue 35. The outer ends of the tongue 35 project toward the coupler head, and when the implement is connected to the hitch the clevice 36 of the implement rests on the tongue, and the coupler head or nose 21 is adapted to project through the clevice.

When the parts are assembled as shown and described and the implement strikes a solid obstruction, an undue pull will be exerted on the coupler head or nose 21, which will tend to swing the tail 22 downwardly away from the drawbar.

This downward movement will force the hinge leaves 28 outwardly, and thus force back the arms 29 beyond the keeper shoulders 34. As the hitch lock lever 15 is normally disposed in an inclined position with the weighted end thereof off-center, as shown in full lines in Figure 1, the upper end of the lever will be swung downwardly and the lower end of the lever upwardly, moving the arms entirely away from the hinge leaves 28. Continued pull on the coupler head or nose will swing the tail coupler to its lowered position with the leaves off the drawbar, and the coupler head or nose will be moved out of the implement clevice. Thus, the implement will be completely free from the drawbar.

To limit the downward swinging movement of the upper end of the hitch lock lever 15, the latch lever 12 carries a forwardly extending hook 36, which is arranged in the path of a cross-bar 37 carried by the said lever 15. If desired, the body portion of the hook can be provided with a slight depression 38 for normally resting on the cross-bar 37 when the lever 15 is in its raised position.

A contractile coil spring 39 can be employed for connecting the latch lever 12 with the bracket, so as to insure the proper engagement of the latch lever hook with the cross-bar 37.

The lower ends of the swinging arms 29 can carry anti-friction rollers 40 for engaging the leaves 28, so as to reduce wear on these parts.

When it is desired to again couple the implement with the tractor, the clevice 36' is placed on the tongue 35 and the tail of the coupler head is raised so as to move the coupler head or nose 21 through the clevice. The hinge leaves 28 are then swung over the drawbar, and the lower end of the lever 15 is moved manually over the leaves 28. This holds the leaves 28 in correct position, and upward swinging movement of the lower lever is prevented due to the engagement of the spring-pressed arms 29 with the keeper shoulders 34.

In order to facilitate the manual release of the implement from the tractor, the outer faces of the legs 16 and 17 of the hitch lock lever 15 can carry sliding release plates 41. These release plates have their lower ends tapered and are adapted to engage the conical heads 33 of the slide rods 32, so as to normally pull outwardly on the slide rods, and thus move the spring-pressed arms 29 away from the stop shoulders 34.

From the foregoing description it can be seen that I have provided an exceptionally simple and durable appliance for permitting the automatic release of a farm implement from a tractor when the farm implement strikes a solid object.

Changes in details may be made without departing from the spirit or the scope of my invention, but what I claim as new is:

1. A releasable implement hitch for tractors comprising, a drawbar, a swinging coupler head pivotally connected to the drawbar having a coupler nose and an inwardly extending tail, a swinging lock lever normally holding the tail against swinging movement, means normally moving the lever out of operative connection with the tail, releasable means normally holding the lever in operative connection with the tail, and means for actuating said releasable means when an undue force is exerted on the coupler nose.

2. A hitch for connecting farm implements with tractors comprising, a drawbar, a coupler head pivotally connected to the drawbar having a coupler nose and a rearwardly extending tail, hinge leaves carried by the tail movable over the drawbar, a pivoted lock lever carried by the drawbar movable over the leaves to hold the same against movement, means normally tending to swing the lever away from said leaves, releasable means for holding the lever against swinging movement and in engagement with the leaves, said leaves functioning to release said means when an undue pull is exerted on the coupler nose.

3. A hitch for releasably connecting farm implements with a tractor comprising, a drawbar, a bracket on said drawbar, a coupler head pivotally connected to the outer end of the drawbar having a coupler nose and an inwardly extending tail, hinge leaves carried by the tail adapted to extend over the drawbar when the nose is in its normal operative position, a swinging lock lever rockably mounted intermediate its ends on the bracket, said lever having its lower end bifurcated and straddling the bracket for fitting over said leaves when the leaves are over the drawbar, keeper shoulders on the bracket, means normally tending to swing the lever away from the hinge leaves, pivoted arms carried by the bifurcated portion of the lever arranged in the path of the stop shoulders for normally holding the lever against movement, the leaves being adapted to actuate the arms when undue pull is exerted on the coupler nose.

4. A hitch for releasably connecting farm implements with a tractor comprising, a drawbar, a bracket on said drawbar, a coupler head pivotally connected to the outer end of the drawbar having a coupler nose and an inwardly extending tail, hinge leaves carried by the tail adapted to extend over the drawbar when the nose is in its normal operative position, a swinging lock lever rockably mounted intermediate its ends on the bracket, said lever having its lower end bifurcated and straddling the bracket for fitting over said leaves when the leaves are over the drawbar, keeper shoulders on the bracket, means normally tending to swing the lever away from the hinge leaves, pivoted arms carried by the bifurcated portion of the lever arranged in the path of the stop shoulders for normally holding the lever against movement, the leaves being adapted to actuate the arms when undue pull is exerted on the coupler nose, and means for limiting the swinging movement of the lever.

5. A hitch for releasably connecting farm implements with a tractor comprising, a drawbar, a bracket on said drawbar, a coupler head pivotally connected to the outer end of the drawbar having a coupler nose and an inwardly extending tail, hinge leaves carried by the tail adapted to extend over the drawbar when the nose is in its normal operative position, a swinging lock lever rockably mounted intermediate its ends on the bracket, said lever having its lower end bifurcated and stradling the bracket for fitting over said leaves when the leaves are over the drawbar, keeper shoulders on the bracket, means normally tending to swing the lever away from the hinge leaves, pivoted arms carried by the bifurcated portion of the lever arranged in the path of the stop shoulders for normally holding the lever against movement, the leaves being adapted to actuate the arms when undue pull is exerted on the coupler nose, and means for limiting the swinging movement of the lever, said means including a spring-pressed latch lever and a crossbar carried by the lock lever.

6. A hitch for releasably connecting a farm implement with a tractor comprising, a drawbar, an upstanding bracket on said drawbar, a coupler head pivotally connected to the outer end of the drawbar including a coupler nose and an inwardly extending tailpiece, hinge leaves of an angle-shape in cross-section carried by the tail and adapted to normally rest on the upper face of the drawbar when the hose is in an operative position, a lever rockably mounted intermediate its ends on the bracket, the lower end of the lever being bifurcated for straddling said bracket, spring-pressed arms pivotally carried by the bifurcated portion of the lever normally urged into engagement with the spring leaves for holding said leaves against movement, means normally tending to swing the bifurcated portion of the lever and the arms away from the leaves, keeper shoulders arranged in the path of the arms to hold the lever against swinging movement, the leaves being adapted to move the spring-pressed arms away from the shoulders when an undue pull is exerted on the nose of the coupler head, and manual means for moving the arms away from the keeper shoulders.

ELDRED H. SCHNUELLE.